Feb. 2, 1943.  W. I. JONES  2,309,733
ROTARY OPERATIVE FASTENER
Filed Nov. 10, 1938  2 Sheets—Sheet 1
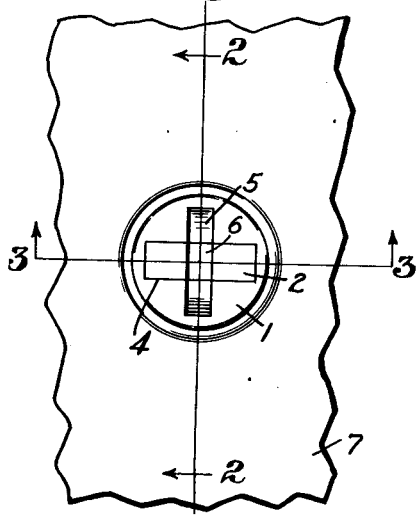
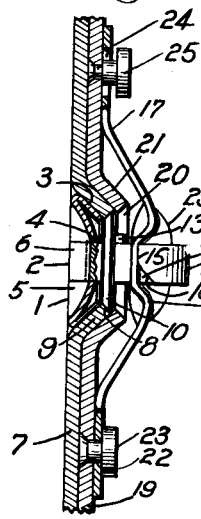
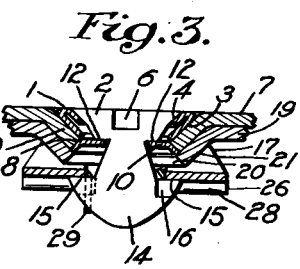
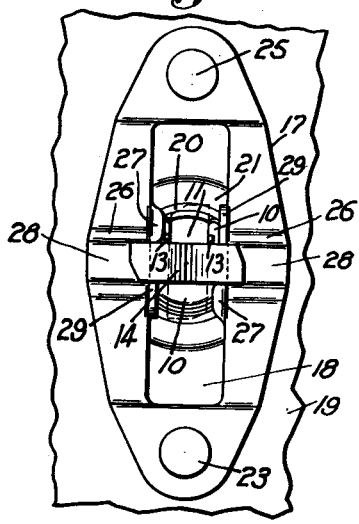
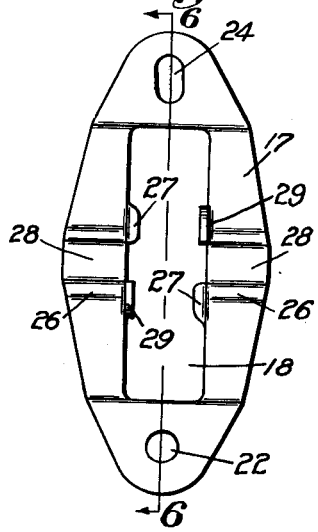
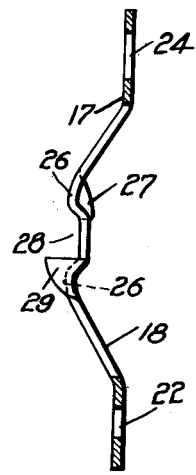
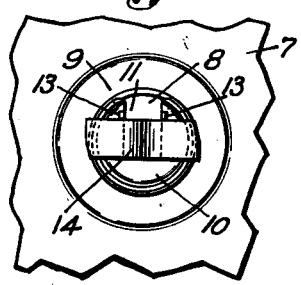
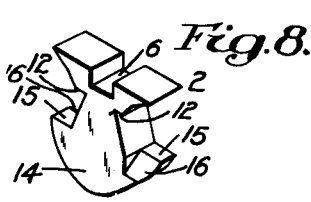
Inventor:
Walter I. Jones Feb. 2, 1943. W. I. JONES 2,309,733
ROTARY OPERATIVE FASTENER
Filed Nov. 10, 1938 2 Sheets-Sheet 2
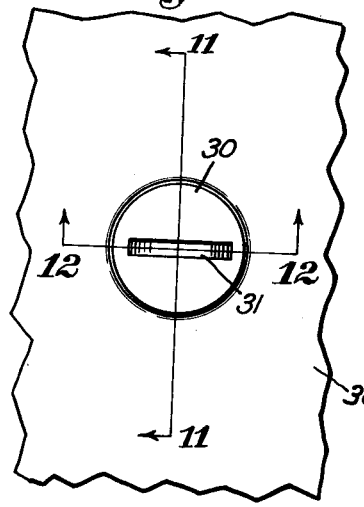
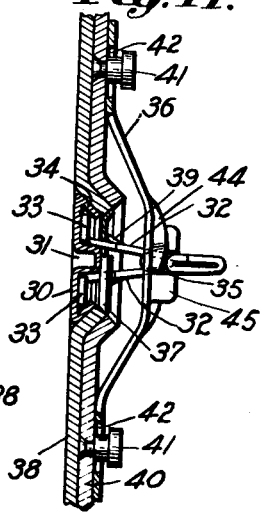
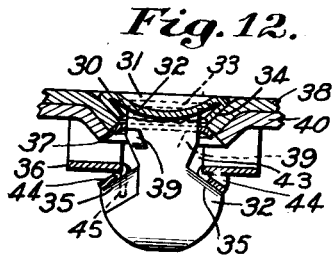
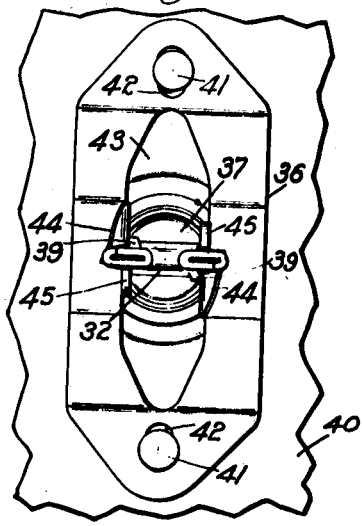
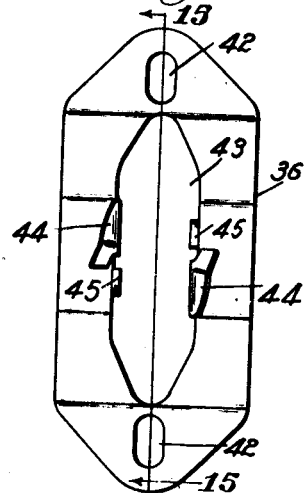
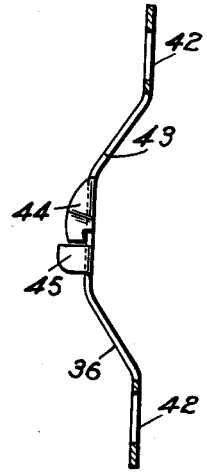
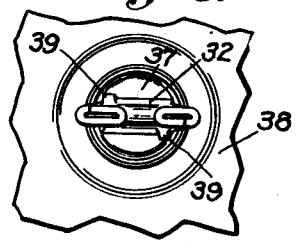
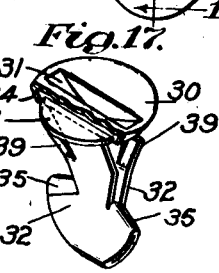
Inventor:
Walter I. Jones Patented Feb. 2, 1943

2,309,733

UNITED STATES PATENT OFFICE 2,309,733

ROTARY OPERATIVE FASTENER

Walter I. Jones, Belmont, Mass., assignor to United-Carr Fastener Corporation, Cambridge, Mass., a corporation of Massachusetts Application November 10, 1938, Serial No. 239,826

9 Claims. (Cl. 24—221)

My invention aims to provide improvements in rotary operative type fasteners and installations thereof.

In the drawings which illustrate preferred embodiments of my invention:

Fig. 1 is a front elevational view of a portion of an installation of one embodiment of my invention;

Fig. 2 is a section taken on the line 2—2 of Fig. 1, certain parts remaining in elevation;

Fig. 3 is a section taken on the line 3—3 of Fig. 1, the shank member of the rotating part being shown in elevation;

Fig. 4 is a rear view of the installation shown in Fig. 1;

Fig. 5 is an elevational view of the spring member per se;

Fig. 6 is a section of the spring member taken on the line 6—6 of Fig. 5;

Fig. 7 is a rear view of the rotating member assembly;

Fig. 8 is a perspective view of the shank member of the rotating device;

Fig. 9 is a perspective view of the retainer for securing the rotating device to its support;

Fig. 10 is a front elevational view of another form of fastener in its installation thereof;

Fig. 11 is a section taken on the line 11—11 of Fig. 10, parts remaining in elevation;

Fig. 12 is a section taken on the line 12—12 of Fig. 10, the shank member being shown in elevation;

Fig. 13 is a rear view of the installation shown in Fig. 10;

Fig. 14 is an elevational view of the spring member per se shown in Figs. 11 and 13;

Fig. 15 is a section taken on the line 15—15 of Fig. 14;

Fig. 16 is a rear view of the rotating member installation;

Fig. 17 is a perspective view partly broken away to show the method of assembly; and Fig. 18 is a perspective of the attaching washer for assembling the rotating member to its support.

Referring first to the embodiment of my invention illustrated in Figs. 1 through 9 inclusive, I have shown a rotary operative type of fastener a particular use for which is in connection with aeroplanes. This fastener may be used for any purpose where it is desired to secure together two or more relatively rigid plate-like members. The fastener is composed of two units one of which I shall term a spring member and the other of which I shall term a rotary member.

In the device illustrated the rotary member has a head portion 1 and a shank portion 2 made from separate pieces of metal and adapted to be assembled so as to operate as a single unit. The head member 1 is in the form of a hollow cap preferably having a conical-shaped side wall 3 (Figs. 2 and 3). A slot 4 is cut through the front face of the head member 1 to permit passage of the shank portion 2, as shown in Fig. 3. A depressed portion 5 is formed in the face of the head member 1 at right angles to the slot 4 (Fig. 1) and provides a tool-receiving recess for the reception of any suitable tool by which the rotating member may be turned. In order to complete the tool-receiving recess a slot 6 is cut through one end of the shank member 2.

The support for the rotating member in the installation illustrated is in the form of a piece of sheet metal 7 in which has been formed an aperture 8 surrounded by a conical-shaped portion 9 formed in the sheet metal so that the head member 1 may be assembled with its outside face flush with the outside surface of the plate 7, as indicated in Figs. 2 and 3. This conical-shaped portion 9 provides a bearing surface for the wall 3 of the head member 1. The head member 1 and shank portion 2 are held in assembled relation to the plate 7 in any suitable manner, but I have found that an easy assembly of the parts may be accomplished by the use of a sheet metal washer 10 (Fig. 9) having a slot 11 extending inwardly from one edge so that the washer may be slipped edgewise into engagement with the shank member 2 adjacent to the shoulders 12—12 on the shank portion, as shown in Fig. 3. The washer 10 may be held in place by ears 13—13 (Fig. 9) which are bent downwardly across the slot 11, thus preventing removal, as shown in Fig. 2. The washer 10 preferably bears against the end of the conical wall 9 of the plate 7 (Fig. 3) thereby providing a neat assembly of minimum thickness without interference with any other part of the installation.

The shank portion 2 is preferably flat and has a tapering nose portion 14 which passes through the aperture 8 and beyond the plate portion 7. Adjacent to the nose I have provided spring-engaging portions in the form of lateral projections 15—15 having cam surfaces 16 for cooperation with the spring member of the installation in the manner hereinafter described.

The spring member of my installation, best illustrated in Figs. 4, 5 and 6, is preferably formed from sheet metal and is in the form of an arched elongated plate-like member 17 preferably having an oblong aperture 18 to permit passage of the shank portion 2 of the rotating member and also to provide resiliency to the spring. This spring 17 is preferably mounted on one side of a plate 19 over an aperture 20 also surrounded by a conical-shaped wall 21 adapted to nest with the wall 9 of the plate 7, as shown in Figs. 2 and 3. In this particular spring structure I have provided a circular aperture 22 in one end of the spring through which passes the shank of a rivet 23 to rigidly secure that end of the spring to the plate 19. At the opposite end of the spring I have provided an elongated aperture 24 and in this case I have provided a shouldered rivet 25 securing that end of the spring plate 17 to the plate 19 in such a manner that the plate may readily shift longitudinally thereof relative to the plate 19. At opposite sides of the oblong aperture 18 in the spring plate 17 I have provided cam surfaces 26—26 formed partly by the natural rise of the bow portion of the spring and partly by downwardly extending ear portions 27—27 and these cam portions are adapted to cooperate with the cam surfaces 16—16 on the shank member 2. On opposite sides of the aperture 18 I have also provided depressions 28—28 into which the projections 15—15 of the rotating member finally come to rest. There is also provided a pair of stop members 29—29 adjacent to the depressions 28—28 to limit the rotating movement of the rotary member.

Assuming that all the parts of the installation have been properly assembled, and it is desired to secure the two plate members 7 and 19 tightly against each other by means of my improved fastener, that operation may be brought about by pressing the plate 7 toward the plate 19 with the apertures 8 and 20 of the respective plates in substantial alignment. In this manner the tapering nose portion 14 of the shank 2 passes through the aperture 20 in the plate 19, then through the aperture 18 in the spring plate 17 where, upon rotation of the head member 1 in a clockwise direction, the projections 15—15 are rotated over the cam surfaces 26—26 until they snap into the recesses 28—28, as shown in Fig. 4. In this position the fastener is locked together and the spring is under tension, thus drawing the plates 7 and 19 tightly against each other. During this fastening operation the cam surfaces 16—16 on the shank of the rotating member cooperate with the cam surfaces 26—26 of the spring plate member 17 in such a way that variations in thickness are taken care of and the spring is compressed, to a greater or lesser degree, to make a tight interlocking of the fastener parts.

During the compression operation of the spring it tends to flatten and thereby become elongated and I have found that by permitting free movement of at least one end of the spring, due to the operation of the shouldered rivet 25 and the slot 24, the spring action is much better than it would be if both ends of the spring were tightly riveted against the plate 19. This lost-motion connection provides a livelier and more lasting spring. Also during the fastening operation considerable misalignment of parts may be corrected due to the fact that the tapered nose portion 14 may engage the conical wall 21 of the plate 19 and guide itself into and through the aperture 20 when pressure or a blow is exerted against the face of the rotating member. Furthermore, the oblong-shaped nose of the shank portion 2 need not be in absolute alignment with the oblong aperture 18 in the spring plate 17 because even though it is turned at an angle up to approximately 90° out of the actual alignment it will automatically twist itself as it is forced through the aperture 18 due to the fact that the shank 2 is provided with the tapered nose 14 and also due to the fact that it is free to turn. Even though the shank is exactly 180° relative to the aperture 18 engagement is easily brought about by turning the head slightly as pressure is exerted. Thus I have provided a relatively simple rotary type fastening means which readily adapts itself to varying conditions and it is strong and durable.

Referring now to the embodiment of my invention illustrated by Figs. 10 through 18 inclusive, I have shown a fastening means which, except for details of construction, is the same as that described above. Therefore in connection with this fastener I will limit the description to the difference in details.

The rotating member of this fastener is also made in two pieces, but in this case the head portion 30 has only the tool-receiving recess 31. The shank member is formed from thin sheet metal and is folded at its outer end to provide a pair of leg portions 32—32 (Figs. 11 and 17) with semi-circular foot portions 33—33 fitting into the head at opposite sides of the recess portion 31 and held in assembly by the tapered wall 34. In this manner I have provided a rotating member which in some respects is easier and cheaper to manufacture than the one previously described and its appearance is better since the slot 4 in the part 1 of my first preferred device is eliminated, as clearly shown in Fig. 10. Another feature of this rotating member is in the diverging shoulders 35—35 formed by curled portions of the metal. These diverging shoulders provide smooth cam surfaces for engagement with the spring member 36 and also, because of their diverging form, provide a very satisfactory take-up means to accommodate variations in thicknesses of the installations.

Another feature in connection with the rotating member is in the attaching washer 37 (Fig. 18) which is formed with an oblong aperture and is adapted to be engaged with the shank by hooking it under one shoulder 35 and then tipping it into place below the shoulder. Assuming, of course, that the rotating member has been placed in the proper position with relation to its support 38 the washer may now be pressed toward the plate where it snaps by yieldable finger portions 39—39 (Figs. 11, 12 and 17). These finger portions engage the washer 37 and the washer in turn engages the plate 38 thereby holding the rotating member in assembly with the plate 38. The particular construction of the rotating members disclosed herein is not claimed herein as it is to be the subject of a separate divisional application.

The spring member 36 is mounted on its supporting plate 40 by a pair of shouldered rivets 41—41 cooperating with elongated slots 42—42 in opposite ends of the spring member 36, thus providing a full floating spring to give maximum efficiency as to action and life of the fastener. The spring 36 has an oblong aperture 43 through which the shank of the rotating member may pass. Instead of forming cam portions and recesses in the faces of the spring, I have provided cam portions by bending ears 44—44 from the material cut out to form the apertures 43 (Figs. 14 and 15). These ears 44—44 are bent outwardly away from each other at opposite sides of the aperture 43 and are so shaped that they have rising portions extending away from the plane of the spring and then valley portions formed by portions sloping toward the plane of the plate, all as clearly illustrated in various figures of the drawings. I have also provided a pair of stops 45 so that the shoulders 35—35 of the rotating member may be stopped in the valleys, as shown in Fig. 13. A spring member formed in this manner is to some extent an improvement over the spring illustrated and described in connection with Figs. 1 through 9 because it presents fewer, if any, obstructions at that side of the spring from which the shank of the rotating member enters. Thus there is easier automatic alignment of the parts when pressed toward each other.

The various advantages of the details of applicant's structures could be described more specifically but this is not deemed necessary since anyone skilled in the art will readily appreciate the advantages from an inspection of the drawings and the general description already presented. Therefore, while I have illustrated and described preferred embodiments of my invention I do not wish to be limited thereby because the scope of my invention is best defined by the following claims.

I claim:

1. In a fastener for cowling or the like, a fastening element comprising a metal strip having a central aperture and rigid cam and groove means adjacent said aperture adapted to receive and interlock with a cooperating rotary fastening element in response to turning movement of the latter, said strip having resilient metal sections beyond said cam and groove means and bearing sections beyond said resilient sections adapted to bear slidably upon supporting structure in a plane spaced from the remainder of the strip, a longitudinal slot in at least one of said bearing sections, and a fastening member having a reduced portion extending through said slot and adapted to be secured permanently to a part to be fastened.

2. In a fastener for cowling or the like, an elongated resilient fastening element adapted to be secured adjacent its extremities to one of the parts to be fastened, said element having a central portion to be interlocked with a cooperating rotary fastening element and resilient portions between said central portion and said extremities, each extremity of said resilient element being formed with a longitudinally elongated opening, a fastening member extending through and confined within each opening, and a flange on each member overlying an adjacent portion of the extremity of the fastening element to hold the same in fastenable position on said part.

3. In a fastener for cowling or the like, a fastening element comprising a strip of sheet metal having a central cam zone formed with an opening and means on opposite sides of the opening to receive and cooperate with a cooperating rotary fastening element in response to turning movement of the latter, said strip having bowed resilient portions beyond said central zone and bearing portions beyond said resilient portions adapted to bear slidably upon supporting structure in a plane spaced from said central portion, attaching means adapted to be fixed to a part to be fastened for engaging said strip and keeping the same in fastenable position, and slidable connections between said attaching means and said bearing portions for allowing substantial sliding movement of the latter relative to such structure in said plane, said connections including means preventing any substantial movement of said bearing portions away from said plane and means limiting the extent of sliding movement of said bearing portions in said plane.

4. A fastener for cowling and the like, in combination with a support member and a member to be supported, one of said members having a rotary fastening stud formed with radial arms; of a fastening spring element mounted on the other member for interlocking cooperation with the rotary stud, said fastening element being formed with a central aperture for the passage of the rotary stud and radial arms thereof and having a central cam zone spaced outwardly from the members for cooperative engagement with said radial stud arms, resilient portions between the cam zone and the extremities of said fastening element, and means movably supporting at least one extremity of the fastening element relative to its adjacent member.

5. A fastener for cowling and the like, in combination with a support member and a member to be supported, one of said members having a rotary fastening stud formed with radial arms; of a fastening spring element mounted on the other member for interlocking cooperation with the rotary stud, said fastening element being formed with a central aperture for the passage of the rotary stud and radial arms thereof and having a central cam zone outwardly spaced from its member for cooperative engagement with said radial stud arms, resilient portions between the cam zone and the extremities of said fastening element, and means movably supporting at least one extremity of the fastening relative to its adjacent member, permitting the fastening element to elongate and flatten under compression.

6. A fastener for cowling and the like, in combination with a support member and a member to be supported, one of said members having a rotary fastening stud formed with radial arms; of a fastening spring element mounted on the other member for interlocking cooperation with the rotary stud, said fastening element being formed with a central aperture for the passage of the rotary stud and radial arms thereof and having a central cam zone outwardly spaced from its member for cooperative engagement with said radial stud arms, said cam zone including raised portions integral with said fastening element and shaped to guide said rotary stud into fastening engagement therewith, resilient portions between the cam zone and the extremities of said fastening element, and means movably supporting at least one extremity of the fastening element relative to its adjacent member.

7. A fastener for cowling and the like, in combination with a support member and a member to be supported, one of said members having a rotary fastening stud formed with radial arms; of a fastening spring element mounted on the other member for interlocking cooperation with the rotary stud, said fastening element being formed with a central aperture for the passage of the rotary stud and radial arms thereof and having a central cam zone outwardly spaced from its member for cooperative engagement with said radial stud arms, said cam zone including spaced pairs of deformations integral with said fastening element adjacent said aperture, at least one of said deformations being in the form of cams shaped to guide the rotary stud into fastening engagement therewith, and another of said deformations being in the form of stop means to limit rotation of the stud, resilient portions between the cam zone and the extremities of said fastening element, and means movably supporting at least one extremity of the fastening element to its adjacent member.

8. A flush type fastening for cowling and the like, in combination with a support member and a member to be supported, each having conical shaped apertured depressions, a rotary stud formed with a shank and radial arms assembled with one of said members, a head on said stud seated in the conical depression of said member; of an elongated resilient fastening element associated with the other of said members, said element having a central portion adapted and outwardly spaced from its member to be interlocked with said rotary stud, resilient portions between said central portion and opposite extremities of said element and means slidably connecting said fastening element to its member permitting said fastening element to elongate and flatten under compression in response to interlocking engagement between said central portion and the radial arms of said stud.

9. A flush type fastening for cowling and the like, in combination with a support member and a member to be supported, each having conical shaped apertured depressions, a rotary stud formed with a shank and radial arms assembled with one of said members, a head on said stud, means for rotatably locking said stud in said member with the head thereof seated in the conical depression of said member; of an elongated resilient fastening element associated with the other of said members, said element having a central portion spaced outwardly from its member and adapted to be interlocked with said rotary stud, resilient portions between said central portion and opposite extremities of said element and means connecting said fastening element to its member permitting said fastening element to elongate and flatten under compression in response to interlocking engagement between said central portion and the radial arms of said stud.

WALTER I. JONES.

CERTIFICATE OF CORRECTION.

Patent No. 2,309,733. February 2, 1943.

WALTER I. JONES.

It is hereby certified that error appears in the printed specification of the above numbered patent requiring correction as follows: Page 2, second column, line 4, before the word "actual" strike out "the"; page 4, first column, line 21, claim 8, strike out "adapted" and insert the same after "member" in line 22, same claim; and that the said Letters Patent should be read with this correction therein that the same may conform to the record of the case in the Patent Office.

Signed and sealed this 18th day of May, A. D. 1943.

(Seal)

Henry Van Arsdale,
Acting Commissioner of Patents.